(12) United States Patent
Nakajima (10) Patent No.: US 7,761,000 B2
(45) Date of Patent: Jul. 20, 2010

(54) IMAGING DEVICE

(75) Inventor: Kenichi Nakajima, Kanagawa (JP)

(73) Assignee: Eastman Kodak Company, Rochester, NY (US)

( * ) Notice: Subject to any disclaimer, the term of this patent is extended or adjusted under 35 U.S.C. 154(b) by 461 days.

(21) Appl. No.: 11/609,953

(22) Filed: Dec. 13, 2006

(65) Prior Publication Data

US 2008/0037975 A1 Feb. 14, 2008

(30) Foreign Application Priority Data

Aug. 8, 2006 (JP) ............................. 2006-215609

(51) Int. Cl.
  *G03B 3/00* (2006.01)
  *G03B 7/087* (2006.01)
(52) U.S. Cl. ...................... 396/104; 396/243
(58) Field of Classification Search ................... 396/51, 396/104, 213, 243
  See application file for complete search history.

(56) References Cited

U.S. PATENT DOCUMENTS

| 5,915,133 | A * | 6/1999 | Hirai et al. ................. 396/48 |
| 2003/0026607 | A1 * | 2/2003 | Okisu et al. ................ 396/213 |
| 2004/0202461 | A1 * | 10/2004 | Nakahara ................... 396/104 |
| 2004/0207743 | A1 * | 10/2004 | Nozaki et al. ............ 348/333.12 |
| 2005/0088542 | A1 * | 4/2005 | Stavely et al. .............. 348/239 |
| 2005/0270410 | A1 * | 12/2005 | Takayama ................... 348/345 |
| 2006/0012702 | A1 * | 1/2006 | Kawahara et al. ............ 348/345 |
| 2007/0030381 | A1 * | 2/2007 | Maeda ....................... 348/345 |
| 2008/0036870 | A1 * | 2/2008 | Uezono .................... 348/222.1 |

FOREIGN PATENT DOCUMENTS

| JP | 2003-344891 | 12/2003 |
| JP | 3626101 | 12/2004 |

* cited by examiner

*Primary Examiner*—Melissa J Koval
*Assistant Examiner*—Leon W Rhodes
(74) *Attorney, Agent, or Firm*—Thomas J. Strouse; Peyton C. Watkins (57) ABSTRACT

In an imaging device, a photographic scene is automatically determined with high accuracy. Distance information is acquired, through a TTL-AF, from an image signal produced by a CCD. Further, a face recognition circuit detects the face of a person in a subject. An AE-AF-AWB value computing section evaluates the reliability of the distance information acquired through the TTL-AF operation, on the basis of a focal length of a lens, an aperture, and a distance to the subject computed from a distance between eyes included in the detected face. A mode-recognition-and-determination-and mode-selection section automatically determines the photographic scene from the distance information acquired through the TTL-AF operation, the reliability of the distance, and an estimated white balance value.

2 Claims, 5 Drawing Sheets

IMAGING DEVICE

CROSS REFERENCE TO RELATED APPLICATIONS

This application claims priority to Japanese Patent Application No. 2006-215609 filed on Aug. 8, 2006, which is incorporated herein by reference in its entirety.

FIELD OF THE INVENTION

The present invention relates to an imaging device, and more particularly, to a technique for automatically determining an imaging scene.

BACKGROUND OF THE INVENTION

Acquiring information about a distance to a subject from autofocus (AF) information in a digital camera or a video camera and using the thus-acquired information to another function have hitherto been carried out. For instance, the distance information is used for automatically determining a photographic scene, such as a close-up, a portrait, a landscape, or the like, in accordance with information about a distance to a subject, to thus automatically set capturing conditions of a digital camera; determining whether or not light from a flash (hereinafter called "flash light") has arrived at a subject during flash photography in accordance with information about a distance to the subject; estimating the degree of contribution of flash light and the degree of contribution of stationary light through use of an automatic white balance in accordance with information about a distance to a subject; and the like.

Japanese Patent Laid-Open Publication No. 2003-344891 describes an apparatus which has face recognition means for recognizing whether or not a subject includes a face and means for detecting the state of the subject and which sets a photographic mode in accordance with the result of recognition of a face and the detected state of the subject. Motion of the subject, the position of the subject, the brightness of the subject, or the like, is used as the state of the subject, and one of the scene modes is distinguished from normal mode, portrait mode, landscape mode, night-view mode, close up mode or sports mode.

Japanese Patent Publication No. 3626101 discloses determining the quantity of flash light from a distance to a subject when the accuracy of measurement of the subject is higher than predetermined accuracy, or firing preliminary flash light to thus determine the distance to the subject when the measurement accuracy is lower than the predetermined accuracy; and adopting the distance to the subject having a higher degree of accuracy to thus determine the quantity of flash light.

There is a case where information about a distance to a subject acquired by an autofocus mechanism is sufficient for controlling a focus of a subject but insufficient for use in determining the photographic scene, or the like, as in the case mentioned above. Specifically, when a deep focus depth is achieved with a short focal distance of a photographing lens and a low aperture; namely, when an autofocus operation is controlled at close range by means of a so-called hill-climbing autofocus, the main subject falls within the focus depth immediately when focusing is set within one meter even in the case where the main subject is located in the vicinity of three meters, and there may arises a case where the autofocus operation has become interrupted at that point in time. In this case, the autofocus operation has already fallen within the focus depth, and hence focusing has been achieved. However, when the distance from the position of the photographing lens to the subject achieved at that time is computed, there is a chance of outputting information that the main subject falls within one meter even when the main subject is actually located at a position of three meters. Accordingly, when range information about an autofocus operation is used, in unmodified form, for determining a photographic scene, there arises a case where a scene, which is at a distance of several meters or more to a subject and should be determined to be a landscape scene, is erroneously determined to be a close-up.

SUMMARY OF THE INVENTION

The present invention provides an imaging device which evaluates the accuracy of information about a distance to a subject acquired by an autofocus mechanism and the degree of reliability and which enables appropriate control in accordance with a result of evaluation.

The present invention provides an imaging device comprising:

an autofocus mechanism;

an evaluation unit for quantitatively evaluating reliability of information about a distance to a subject acquired by the autofocus mechanism; and a determination unit for automatically determining a photographic scene in accordance with a result of evaluation acquired by the evaluation unit.

In the present invention, the evaluation unit includes a unit for detecting a face portion included in a subject; and a unit for detecting information about a second distance to the subject by use of the detected face portion. Reliability of distance information acquired by the autofocus mechanism may also be evaluated by use of the second distance information.

In the present invention, the imaging device further comprises an imaging lens and an aperture, wherein the evaluation means evaluates reliability of distance information acquired by the autofocus mechanism by use of a focal length of the imaging lens, an aperture value of the aperture, and the second distance information.

In the present invention, the imaging device further comprises a color estimation unit which enables estimation of at least any one of the color of a light source and the color of a substance, wherein the determination unit may automatically determine a photographic scene in accordance with an output from the color estimation unit.

According to the present invention, the photographic scene is not determined simply on the basis of distance information. The reliability of distance information is evaluated to thus determine a photographic scene. Accordingly, erroneous determination of a photographic scene can be prevented. Further, the reliability of distance information is evaluated by use of information about a face included in a subject, whereby erroneous determination of a photographic scene, which would otherwise arise particularly during capture of a portrait, can be prevented.

The invention will be more clearly comprehended by reference to the embodiments provided below. However, the scope of the invention is not limited to those embodiments.

BRIEF DESCRIPTION OF THE DRAWINGS

Preferred embodiments of the present invention will be described in detail based on the following figures, wherein.

DETAILED DESCRIPTION OF THE INVENTION

An embodiment of the present invention will be described hereinbelow by reference to the drawings.

<Basic Configuration>

Figure 1:
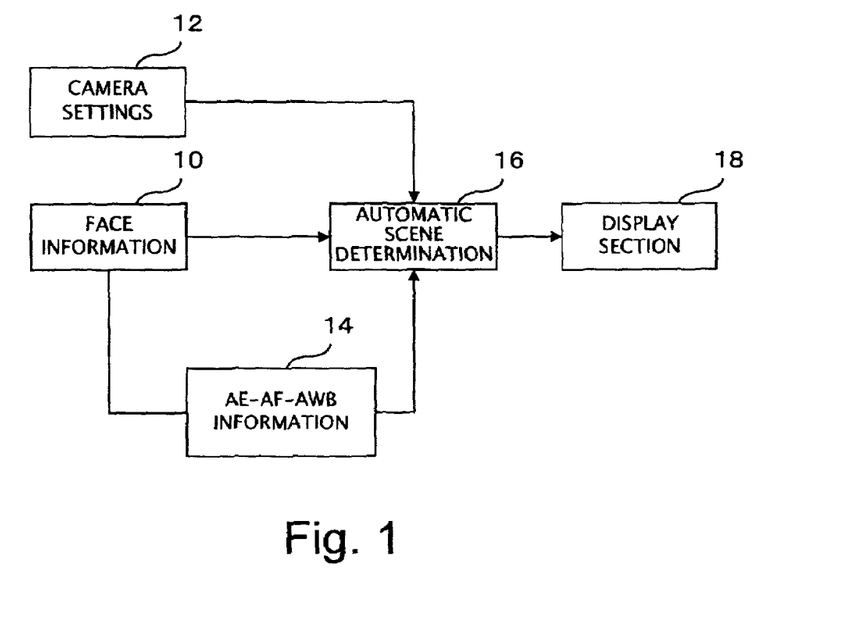
FIG. 1 is a basic block diagram of a digital camera according to an embodiment of the present invention.

FIG. 1 shows the basic block diagram of a digital camera according to an embodiment of the present invention. The digital camera is provided with a face information detection section 10 which detects information about the face of a person included in a subject. Face detection techniques are known and performed by means of pattern recognition or detection of information about a shape or color unique to the face. The face information detection section 10 supplies to an automatic scene determination section 16 information about detection/non-detection of a face. Moreover, various items of setting information 12 about the digital camera; specifically, the zoom position (a focal length) of a zoom lens, enable/disable settings of a flash, the state of an aperture, and the like, are also supplied to the automatic scene determination section 16. Moreover, AE (automatic exposure) control information, AF (autofocus) control information, and automatic white balance (AWB) information 14, which have been acquired from the subject, are also supplied to the automatic scene determination section 16. An autofocus mechanism includes an AF mechanism that employs distance information acquired from the face information in addition to including a normal TTL-AF mechanism. The AF mechanism employing face information detects a distance between eyes included in face information and calculates a distance to the subject by use of the eye-to-eye distance and other optical information. The distance information based on the eye-to-eye distance is used for evaluating the reliability of the TTL-AF mechanism. The automatic scene determination section 16 determines a photographic scene from the presence/absence of a face, distance information acquired through the TTL-AF mechanism, the reliability of distance information acquired through the TTL-AF mechanism, and white balance information. The thus-determined photographic scene is displayed on the display section 18 and used for setting optimal photographic parameters for each photographic scene.

In the present embodiment, a photographic scene is determined by evaluating the reliability of distance information acquired through the TTL-AF and by use of the reliability of distance information of the TTL-AF mechanism rather than being determined merely by use of distance information from TTL-AF result. The reliability of distance information of the TTL-AF mechanism is usually evaluated on the basis of focus depth. Specifically, when the focus depth is deep, the reliability of distance information is evaluated to be low. The reliability of distance information acquired through the TTL-AF mechanism is also evaluated on the basis of the distance information determined from a distance between eyes. In short, when the focus depth is deep and when the reliability of distance information is evaluated to be comparatively low, the reliability of the distance information acquired through the TTL-AF operation is further elaborately evaluated on the basis of the distance information determined from the distance between eyes. When the TTL-AF has ended in failure, a focus can also be controlled by use of the distance information determined from the eye-to-eye distance, and a photographic scene can also be determined by use of the distance information. Even in this case, the reliability of the distance information determined from the eye-to-eye distance is evaluated. Since a photographic scene is determined by evaluating the reliability of the distance, even when, e.g., a distance to the main subject has been determined to be one meter by the TTL-AF mechanism, the subject is not determined to be a close-up when the reliability of the distance is low. Thus, erroneously determining the subject, which should be originally determined to be a portrait, as a close-up can be effectively prevented.

<Detailed Configuration>

Figure 2:
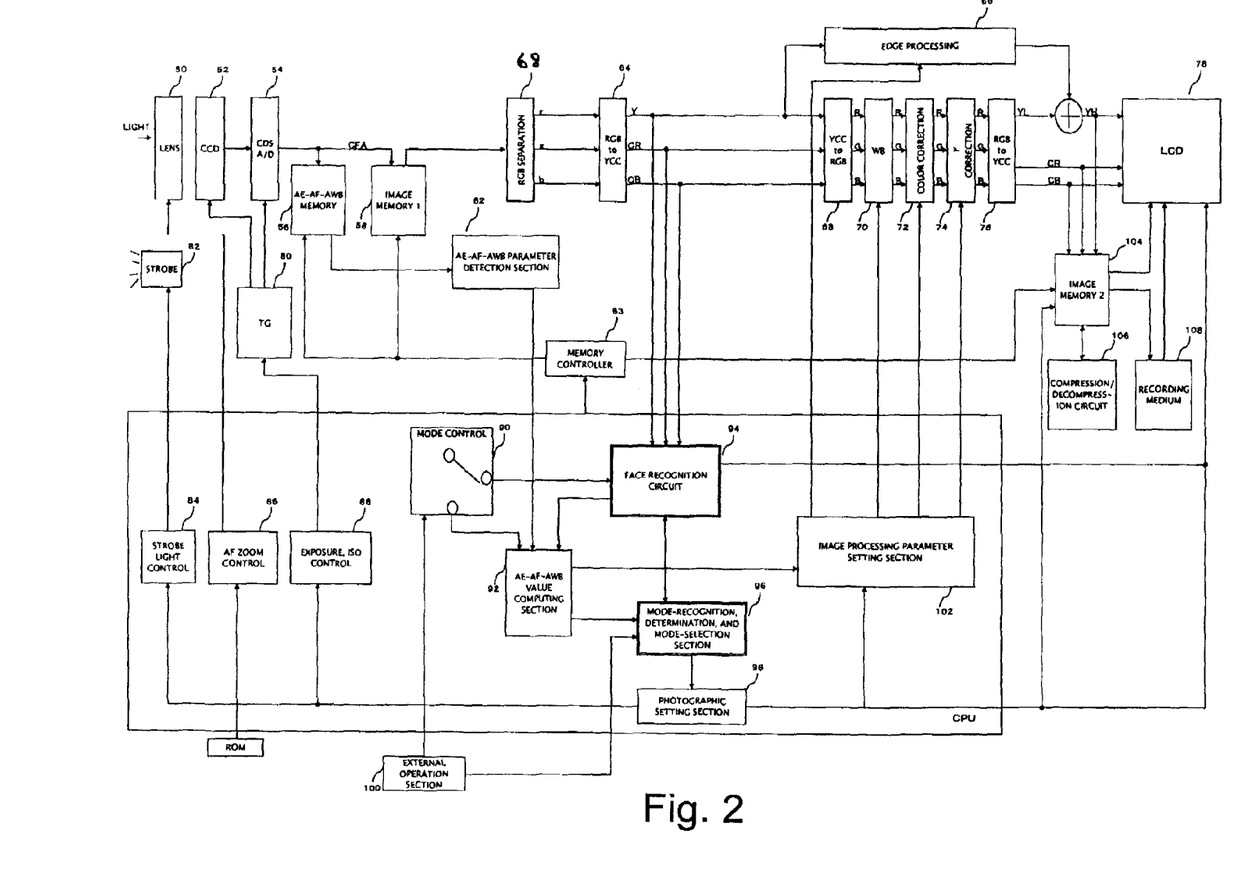
FIG. 2 is a detailed block diagram of the digital camera according to the embodiment of the present invention.

FIG. 2 shows a detailed configuration of the digital camera of the present embodiment. A lens 50 forms, from light originating from a subject, an image on a CCD 52 serving as an imaging element. The lens 50 includes a zoom lens and a focus lens, and is actuated by an AF zoom control section 86. The AF zoom control section 86 controls an AF and a zoom in accordance with parameters previously stored in ROM.

The CCD 52 converts the light originating from the subject into an image signal, and supplies the image signal to a CDS-and-A/D converter 54. The CDS-and-A/D converter 54 converts an analogue image signal into a correlated-double-sampled, digital signal; stores the signal into AE-AF-AWB memory 56, and image memory 58 as well. The CCD 52 and the CDS-AND-A/D converter 54 are activated by a drive signal output from a timing generator TG 80. In accordance with a control signal output from an exposure ISO control section 88, the timing generator TG 80 controls activation of the CCD 52.

In relation to a strobe 82, a strobe light control section 84 controls firing/non-firing of a flash and the quantity of light to be fired.

A YC separation circuit 64 separates an R signal, a G signal, and a B signal into a luminance signal Y and color-difference signals CR and CB, and the thus-separated signals are sequentially supplied to respective processing circuits 68 to 76. The Y signal, the CR signal, and the CB signal are supplied to a face recognition circuit 94. The Y signal undergoes edge enhancement processing in an edge-processing circuit 66. The Y signal, the CR signal, and the CB signal, which have been processed by an RGB separation circuit 68, a WB (white balance) circuit 70, a color correction circuit 72, a γ correction circuit 74, and a luminance signal/color signal separation circuit 76, are added to the edge-enhanced Y signal, and a resultant signal is stored in image memory 104. The image signal stored in the image memory 104 is subjected to JPEG compression in a compression/decompression circuit 106, and the thus-compressed signal is displayed on an LCD 78. Alternatively, the compressed signal is stored in a recording medium 108 such as flash memory or the like. A memory controller 83 controls writing and reading of data into and from the image memory devices 58 and 104.

An external operation section 100 corresponds to user-operable buttons or switches and comprises a power button, a release button, and various changeover buttons. The external operation section 100 includes an operation section for toggling whether to perform face recognition processing and an operation section for toggling whether to perform automatic determination. In synchronism with the operation section, a mode changeover switch 90 is toggled. When face recognition has been activated, the face recognition circuit 94 processes the image signal to thus detect a face in a subject. A result of detection of a face is supplied to a mode-recognition, determination, and mode-selection section 96 and an AE-AF-AWB value computing section 92. An AE-AF-AWB parameter detection section 62 reads an image signal from the memory 56; detects parameters required for AE, AF, and AWB; and supplies the detected parameters to the AE-AF-AWB value computing section 92. The AE-AF-AWB value computing section 92 computes an AE value, an AF value, and an AWB value. However, when face recognition has been activated, an AF value is computed also by use of the result of face recognition supplied by the face recognition circuit 94. In relation to the AF value, the AE-AF-AWB value computing section 92 takes, as main distance information, distance information (distance information acquired through the TTL-AF mechanism) determined from a contrast value of the image signal read from the memory 56; and takes, as auxiliary distance information, distance information computed from the eye-to-eye distance included in the face detected by the face recognition circuit 94. Specifically, when distance information is acquired by the TTL-AF mechanism, an AF is effected by use of the distance information, and the same distance information is supplied to the mode-recognition, determination, and mode-selection section 96, as well. The reliability of the distance information acquired through the TTL-AF operation is evaluated through use of the brightness of the subject, the position of a zoom lens (a focal length), and an aperture value, all of which are acquired from the AE-AF-AWB parameter detection section 62, and the distance information determined from the eye-to-eye distance. A result of evaluation is supplied to the mode-recognition, determination, and mode-selection section 96. In relation to AWB, a certain degree of probability of the color of the light source and a certain degree of probability of a photographic scene are estimated on the basis of color information about the subject. In relation to the light source, sunlight, a fluorescent lamp, candlelight, and the like are estimated. In relation to a photographic scene, flowers, snow, a beach, a text, and the like, are estimated. Since the mode-recognition, determination, and mode-selection section 96 determines a photographic scene, the estimation performed by the computing section 92 may have a certain degree of accuracy. When the external operation section 100 has been set to automatic determination, the mode-recognition, determination, and mode-selection section 96 determines a photographic scene from the result of face recognition supplied by the face recognition circuit 94 and the photometric value, the distance information, the reliability of the distance information, and a result of estimation of a white balance, all of which have been supplied from the AE-AF-AWB value computing section 92. The result of determination is supplied to a photographic setting section 98. In accordance with the determination result, firing of strobe light and exposure ISO are controlled, and a symbol or icon of the determined photographic scene appears on the LCD 78. Moreover, an image-processing parameter setting section 102 is controlled to thus perform edge processing, white balance adjustment, color correction, and γ correction, which are appropriate for the photographic scene. When the external operation section 100 is set to a manual determination, the mode-recognition, determination, and mode-selection section 96 selects a mode set by the user. The face recognition circuit 94, the AE-AF-AWB value computing section 92, the mode-recognition, determination, and mode-selection section 96, the photographic setting section 98, and so forth are constituted in the form of a CPU.

A photographic scene can be automatically determined at a point in time when a release button has been pressed halfway down (S1). The reason for this is that an AF is effected at this point in time and that distance information is acquired. When a focus is controlled at all times without regard to operation of the release button, a photographic scene may also be automatically determined at all times without regard to operation of the release button and displayed on the LCD 78. The user visually recognizes an icon appearing on the LCD 78, thereby ascertaining whether or not the photographic scene automatically recognized by the digital camera coincides with the scene which the user is actually attempting to capture. Only when a coincidence exists, the release button may also be pushed halfway down to thus determine the automatically-determined photographic scene.

Figure 3:
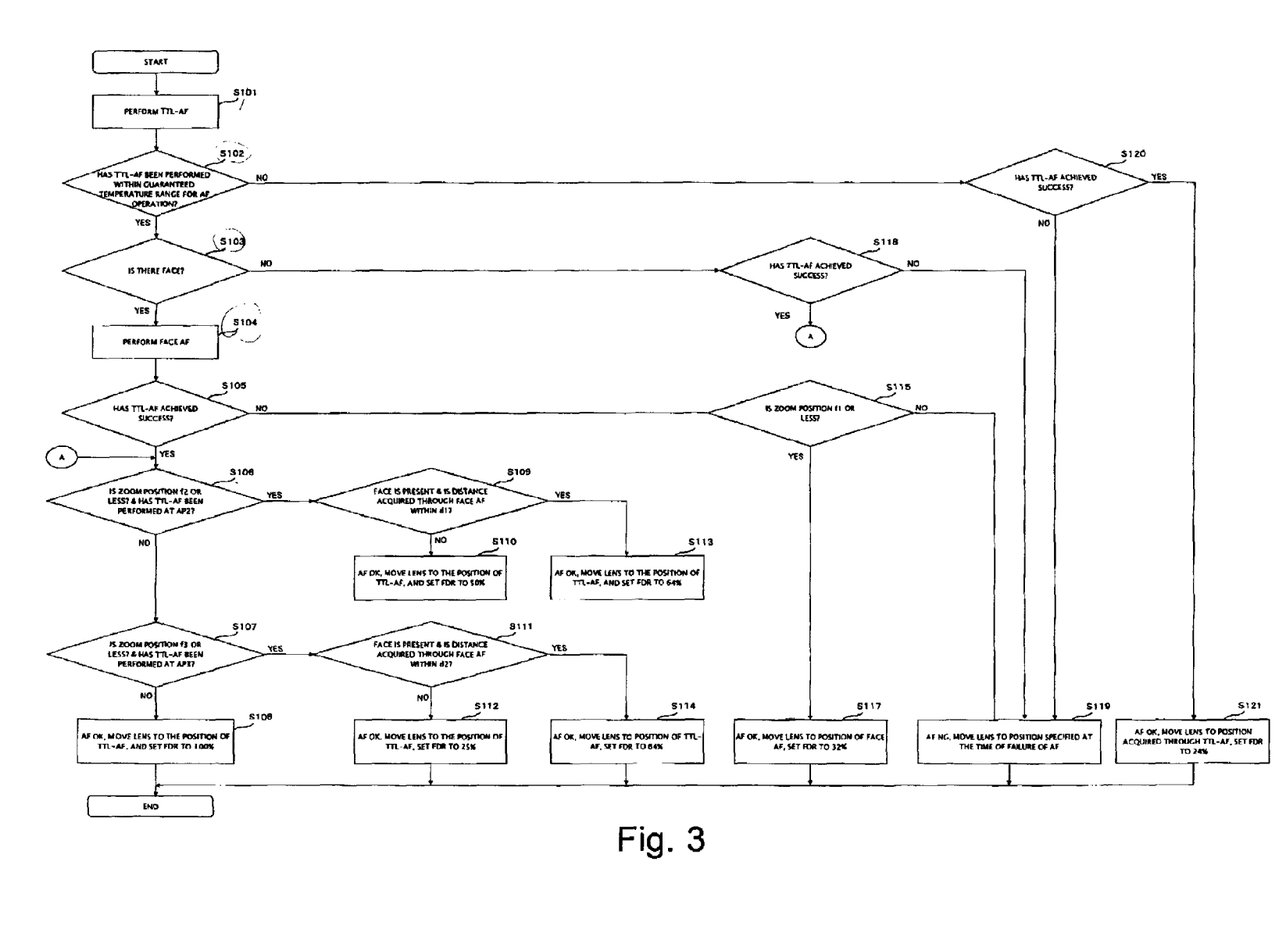
FIG. 3 is a reliability evaluation flowchart of the digital camera according to the embodiment of the present invention.

FIG. 3 shows a flowchart used for evaluating the reliability of information about a distance to a subject (Face Detection Reliability: FDR) acquired by the AE-AF-AWB value computing section 92 serving as an AF mechanism. First, a TTL-AF is executed by use of a known contrast detection method (S101), and a determination is made as to whether or not TTL-AF has been performed within a guaranteed temperature range for AF operation (S102). When TTL-AF has been performed within the guaranteed temperature range, the reliability of TTL-AF is assured to a certain extent. Next, a determination is made as to whether or not the subject includes a face (S103). A determination as to whether or not a face is included in the subject can be made by use of a known technique. For instance, the face is detected by means of detecting a skin color area in the subject, recognizing a pattern unique to a face, detecting a characteristic, physical profile of a face (e.g., detecting eyes), and the like. When the face has been detected, there is performed such a face AF as to adjust a focus on the face (S104). In contrast with the TTL-AF, the face AF involves detecting a distance between eyes included in the face and computing information about a distance to the subject from the eye-to-eye distance. Specifically, since the distance between human eyes is essentially constant, a distance to the subject can be computed through arithmetic operation by detection of a distance between eyes. The face AF has a function of complementing the TTL-AF. During a period in which the TTL-AF achieves a success, the distance information acquired through the TTL-AF operation is persistently used as information about the distance to the subject. When the TTL-AF has ended in a failure, the distance information acquired through the face AF is used for complementing the distance information acquired through the TTL-AF operation. However, in view that the distance information acquired through the TTL-AF operation is not necessarily trustable at all times, the reliability of TTL-AF is evaluated. Therefore, a determination is made as to whether or not the TTL-AF has achieved a success (S105). During a period in which the TTL-AF achieves a success, a determination is made as to whether or not the zoom position of a zoom lens is f2 or less and whether or not the TTL-AF has been performed with an aperture being set to AP2 (S106). Reference symbol f2 denotes a second threshold focal length and is a parameter used for determining whether or not the zoom lens is located in the vicinity of a wide position. When the focal length "f" of the zoom lens is f2 or less, the zoom lens is located in the vicinity of the wide position where the zoom lens has a short focal length. Since the focus depth in the vicinity of the wide position is deeper than in that of tele, the reliability of the TTL-AF becomes relatively low. Moreover, reference symbol AP2 denotes a threshold aperture value and is a parameter used for determining whether or not an intermediate aperture is set. When the zoom position is not f2 or less or when the aperture is not an intermediate aperture (when NO is selected in S106), a determination is further made as to whether or not the zoom position is f3 or less and the TTL-AF has been performed with the aperture being set to AP3 (S107). Reference symbol f3 denotes a third threshold focal length, and there stands a relationship of f2<f3. Reference symbol AP3 denotes a threshold aperture value and is a parameter used for determining whether or not a smaller aperture is set. When the zoom position is not f3 or less or when the aperture is not AP3 (when NO is selected in S107), this means that the focal length of the zoom lens is sufficiently long or that the aperture is sufficiently released. Since the focus depth is sufficiently small, the FDR is set to 100% on the assumption that the distance information acquired through the TTL-AF operation is sufficiently trustable (S108).

Meanwhile, when YES is selected in S107 namely, when the zoom position is longer than f2 and shorter than f3, and when the aperture is small, a determination is then made as to whether or not there is a face and whether or not a distance "d" to the subject acquired through the face AF pertaining to S104 falls within d2 (S111). Reference symbol d2 denotes a threshold distance range and is set to, e.g., 50 cm to 5 m. The farther the distance to the subject, the deeper the focus depth and the lower the accuracy of distance information. Consequently, when the distance "d" to the subject acquired through the face AF is other than d2, the reliability of the distance information acquired through the TTL-AF operation is determined to be low, and the FDR is set to 25% (S112). Moreover, when the distance "d" to the subject acquired through the face AF falls within d2, the distance information acquired through the TTL-AF operation is determined to be relatively high (when YES is determined in S107, and the reliability of the distance information is smaller than 100% because the zoom position is f3 or less and the aperture is small), and the FDR is set to 64% (S114).

When YES is selected in S106; namely, when the zoom position is f2 or less, and when the aperture is set to AP2 (an intermediate aperture), a determination is then made as to whether or not there is a face and whether or not the distance "d" to the subject acquired through the face AF falls within d1 (S109). Reference symbol d1 denotes the range of a threshold distance and is set to 50 cm to 5 m. A relationship of d1=d2 may also be achieved. When the distance "d" is other than d1, the FDR is set to 50% on the assumption that the reliability of the distance information acquired through the TTL-AF operation is low (S110). Attention is paid to the fact that the FDR is set to 25% in S112 and to 50% in S110. A conceivable reason for this is that there stands a relationship of f2<f3 and that the reliability of the distance information is relatively high. If the distance "d" to the subject acquired through the face AF falls within d1, the distance information acquired through the TTL-AF operation is determined to be relatively high, and the FDR is set to 64% (S113).

All of the TTL-AF operations have achieved a success in processing pertaining to steps S108, S110, S112, S113, and S114. Accordingly, the focus lens is actuated to a focus position acquired through the TTL-AF operation.

Meanwhile, when NO is selected in S105; namely, when the TTL-AF has ended in failure, a determination is then made as to whether or not the position of the zoom lens is f1 or less (S115). Reference symbol f1 denotes a first threshold focal length and is set to a comparatively large value. For instance, there stands a relationship of f2<f3<f1. A relationship of f3=f1 or another relationship of f2<f1<f3 may also be achieved. When the position of the zoom lens exceeds f1, the resolution of the distance "d" achieved through the face AF is decreased. Accordingly, both the TTL-AF and the face AF are determined to have ended in failure, and the lens is actuated to a position specified at the time of failure of the AF. The reliability of the distance "d" is not evaluated (S119). When the position of the zoom lens is f1 or less, the reliability of the distance "d" of the face AF is evaluated. When the reliability is high, the lens is actuated to the position achieved through the face AF, and the FDR is set to 32% (S117). The FDR achieved in this case does not represent the reliability of the distance information acquired through the TTL-AF operation, but represents the reliability of the distance information acquired through the face AF. Since the reliability of the face AF operation is relatively lower than that acquired through the TTL-AF operation, the FDR is set to 32% rather than to 100% even when the distance information has been determined to be trustable.

When NO is selected in S103; namely, when the subject does not include any face, the face AF cannot be utilized. Accordingly, a determination is made as to whether or not the TTL-AF operation has achieved a success (S118). When the TTL-AF has achieved a success, processing pertaining to S106 and processing subsequent thereto is executed. Since the face AF cannot be carried out, NO is selected through a determination at all times in S109 or S111. The FDR is set to any of a value of 100%, a value of 50%, and a value of 25%, in accordance with the zoom position and the aperture value. When no face has been found and the TTL-AF has also ended in failure (when NO is selected in S118), the AF does not have any means for focus. Accordingly, the lens is actuated to the position specified at the time of a failure of the AF (S119). At this time, there is no distance information acquired through the TTL-AF operation, and hence the reliability of distance information is not evaluated.

Moreover, when NO is selected in S102; namely, when the TTL-AF has been performed outside the guaranteed temperature range, a determination is made as to whether or not the TTL-AF has achieved a success (S120). When the success is not achieved, the lens is actuated to the position specified at the time of a failure of the AF, and the reliability of distance information is not evaluated (S119). When the AF has achieved a success, the TTL-AF has been performed outside the guaranteed temperature range, and hence the reliability of the distance information acquired through the TTL-AF operation is determined to be low, and the FDR is set to 24% (S121).

As mentioned above, the reliability of the distance information acquired through the TTL-AF operation is quantitatively evaluated in accordance with the focal length of the zoom lens, the state of the aperture, and the information about a distance to a subject acquired through the AF operation. The evaluated reliability is used for automatic determination of a photographic scene performed by the mode-recognition, determination, and mode-selection section 96.

Figure 4:
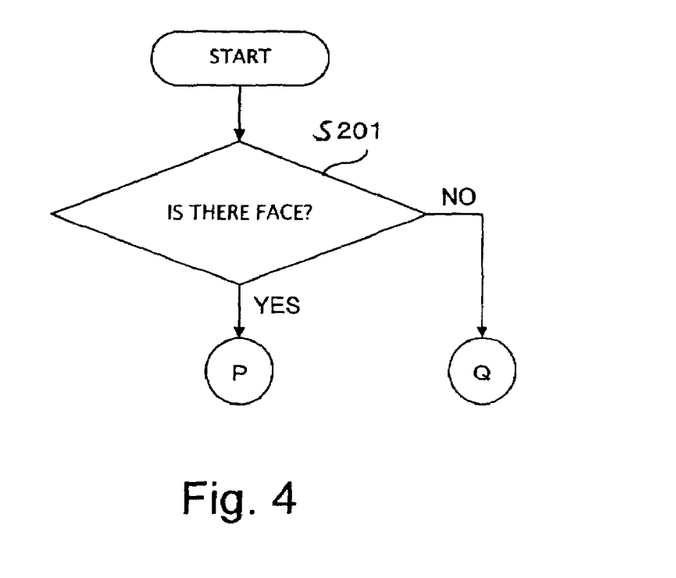
FIG. 4 is a first step scene select flowchart of the digital camera according to the embodiment of the present invention.

FIG. 4 shows a flowchart for automatically determining a photographic scene of the present embodiment. The drawing relates to an overall processing flowchart, and a determination is made as to whether or not the subject includes a face (S201). When the subject includes a face, processing proceeds to P processing of determining a photographic scene relevant to a portrait. When the face is not included, processing proceeds to Q processing of determining a photographic scene irrelevant to a portrait. In the present embodiment, photographic scenes to be determined include a portrait, a night portrait, candlelight, a text, flowers, snow/beach, a landscape (sight), backlight, a close-up, and an auto (AUTO) scene. A portrait, a night portrait, and candlelight are photographic scenes relevant to the portrait. A text, flowers, snow/beach, a landscape (sight), backlight, and a close-up are photographic scenes irrelevant to the portrait. The auto (AUTO)

is a mode achieved when difficulty is encountered in determining a photographic scene, and means a common photographic scene.

Figure 5:
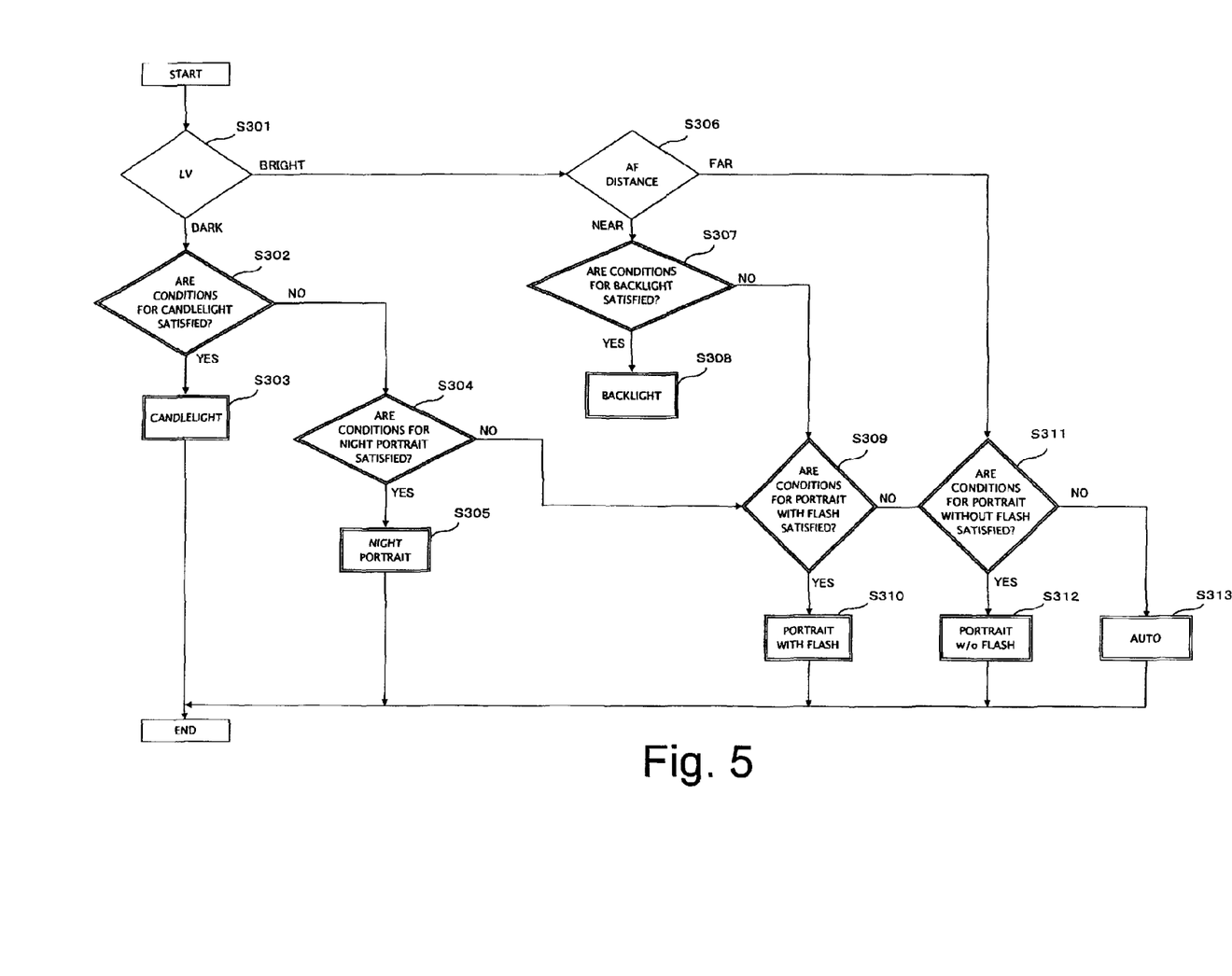
FIG. 5 is a flowchart of processing performed when a face has been recognized in the present embodiment.

FIG. 5 shows a flowchart of P processing performed when a face in the subject has been detected. First, a determination is made as to whether the brightness LV of the subject is bright or dark (S301). Specifically, the brightness value LV acquired through photometry is compared with the threshold value. When the brightness value is the threshold value or less, the subject is determined to be dark. When the brightness value LV has exceeded the threshold value, the subject is determined to be bright. When the subject has been determined to be dark, a determination is made as to whether or not conditions for candlelight are satisfied (S302). The conditions for candlelight are as follows.

<Conditions for Candlelight>
Brightness Value LV<4.5
Distance Information<5 m
Reliability FDR of distance information>50%

The light source is determined, from white balance, to be candlelight with high probability. The distance information is distance information acquired through the TTL-AF operation. As mentioned previously, the reliability FDR of distance information is determined from the focal length of the zoom lens, an aperture value, and the distance "d" of the face AF. The reliability FDR exceeds 50% when the FDR assumes a value of 100% or a value of 64% and in the cases of S108, S113, and S114. When the conditions for candlelight are satisfied, the photographic scene is determined to be candlelight, and a symbol showing candlelight (e.g., a symbol or icon of a candle) is displayed on the LCD 78. When the conditions for candlelight are not satisfied, a determination is then made as to whether or not the conditions for a night portrait are satisfied (S304). The conditions for a night portrait are as follows.

<Conditions for Night Portrait>
Brightness Value LV<4.5
Distance Information<5 m
Reliability FDR of Distance Information>50%

Consequently, when the reliability FDR of distance information exceeds 50%, the photographic scene is determined to be a night portrait. In contrast, when the reliability FDR of distance information is 50% or less, the photographic scene is not determined to be a night portrait. In FIG. 3, when a value of 32% is achieved in S117 (when the TTL-AF has ended in a failure and the face AF has achieved a success with a high degree of reliability), the reliability FDR is included in conditions under which selection is performed at a reliability FDR of 50% or less. The ratio of detection of a night portrait mode can be enhanced without involvement of erroneous detection. In the prior art, when the subject is simply dark and when a face in the subject has been detected, there may be a case where processing automatically proceeds to a night portrait mode. However, in the present embodiment, processing proceeds to the night portrait mode only when the reliability of distance information is assured in excess of a predetermined value. When conditions for a night portrait are satisfied, a photographic scene is determined to be a night portrait. A symbol (e.g., a symbol or icon consisting of a person and a star) showing a night portrait is displayed on the LCD 78. When conditions for a night portrait are not satisfied, processing proceeds to processing pertaining to S309 to be described later.

When the subject has been determined to be bright in S301, a determination is made as to whether the distance acquired through the TTL-AF operation is near or distant (S306). This determination is also rendered by comparison between the distance with a predetermined threshold distance. When the distance is near, a determination is made as to whether or not conditions for backlight are satisfied (S307). Conditions for backlight are as follows.

<Conditions for Backlight>
The brightness LV exceeds a predetermined value.
Reliability FDR of Distance Information>50%
Flashing operation is not inhibited.

When flashing operation has been inhibited by the user, such a setting is not determined to be a condition for backlight. During backlight operation, a flash must generally be fired. When the user sets the flash to an inactive position to thus inhibit flashing operation, automatically determining a photographic scene as backlight is not preferable. When the conditions for backlight are satisfied, the photographic scene is determined to be backlight (S308), and a symbol or icon representing backlight is displayed on the LCD 78. When the conditions for backlight are not satisfied, a determination is made as to whether or not conditions for the next portrait with flash light are satisfied (S309). The conditions of a portrait with flash light are as follows.

<Conditions for Flash Light Portrait>
0.5 m<distance information<2 m
Reliability FDR of distance information>50%
Flashing operation is not prohibited.

When the conditions for a portrait with flash light are satisfied, the photographic scene is determined to be a portrait with flash light (S309), and a symbol or icon representing a portrait with flash light is displayed on the LCD 78. When the conditions for a portrait with flash light are not satisfied, a determination is made as to whether or not conditions for the next portrait without flash light are satisfied (S311). Conditions for a portrait without flash light are essentially the same as those for a portrait with flash light, but inhibition of flashing operation is not included in the conditions. When the conditions are satisfied, the photographic scene is determined to be a portrait without flash light (S312). In other cases, settings are made to the AUTO mode (S313).

Figure 6:
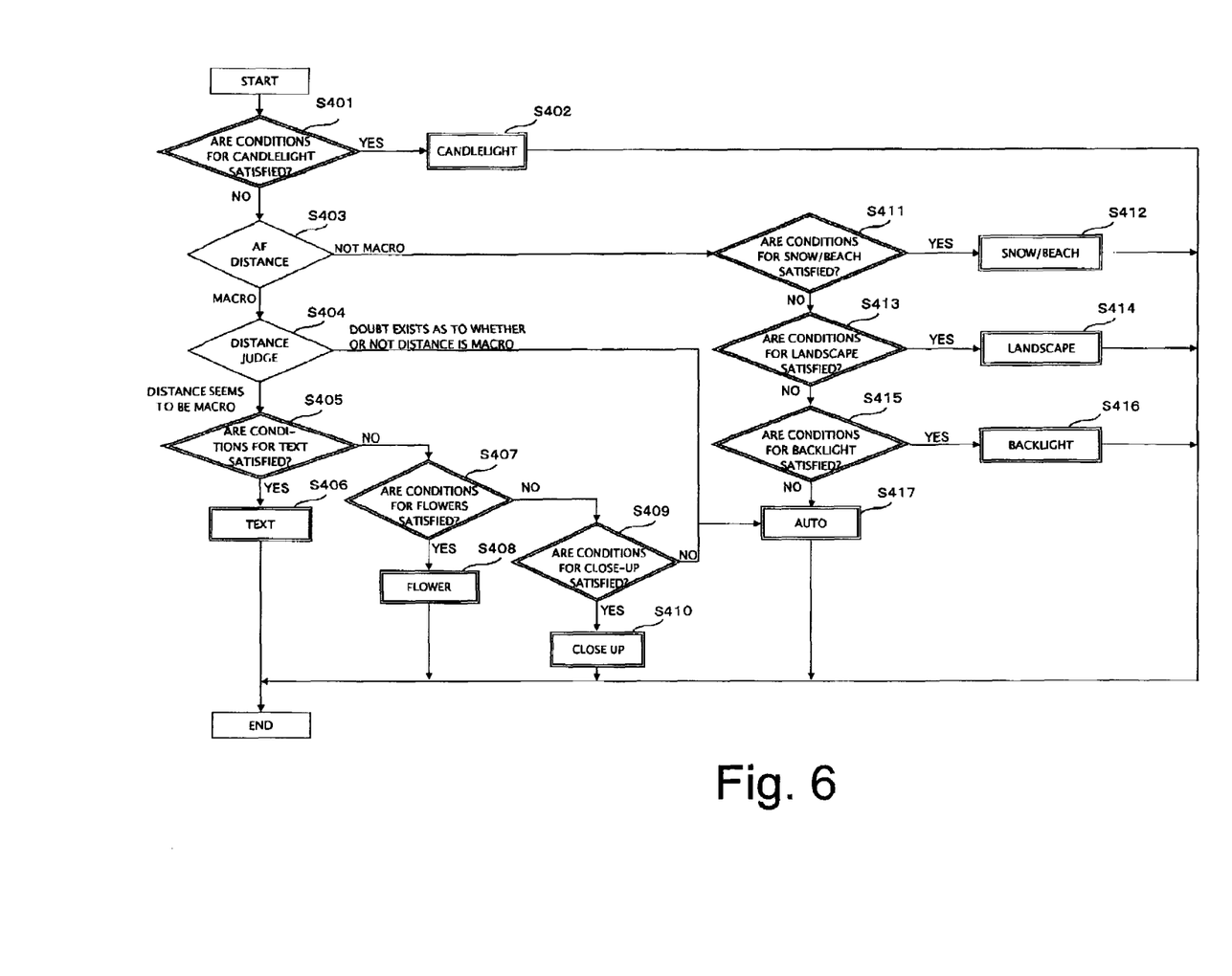
FIG. 6 is a flowchart of processing performed when the face has not been recognized in the present embodiment.

FIG. 6 shows a flowchart of Q processing performed when a face in a subject is not detected. First, a determination is made as to whether or not the conditions for candlelight are satisfied (S401). The conditions for candlelight are as mentioned previously. When the conditions for candlelight are satisfied, the photographic scene is determined to be candlelight (S402). When the conditions for candlelight are not satisfied, a determination is made as to whether or not the distance information acquired through the TTL-AF operation shows closeness (macro) or remoteness (S403). When the information shows closeness, a determination is made as to whether the reliability FDR of the distance information is low and untrustable or highly trustable (S404). When the FDR is 0% or thereabouts or 24% or thereabouts, the distance information is determined to be untrustable. In contrast, when the FDR is 0% or more or 24% or more, the distance information is determined to be trustable. As a matter of course, when the FDR is not 0%, the distance information may also be indiscriminately determined to be trustable. Alternatively, provided that an FDR of 50% or more is achieved up to a certain focal length and an FDR of 0% or more is achieved at a focal length which is longer than the certain focal length, erroneous detection of a close-up of a landscape can be avoided. When the distance information is determined to be trustable, a determination is then made as to whether or not conditions for a text are satisfied (S405). Conditions for a text are as follows.

<Conditions for a Text>
Brightness Value LV<12
The distance is macro.
Reliability RDF of distance information>0%
The photographic scene is determined, from white balance, to be a text with high possibility.

In relation to white balance, when the color of the subject is determined to be gray, the photographic scene is assumed to be a text with high possibility. When the conditions for a text are satisfied, a photographic scene is determined to be a text (S406), and a symbol or icon representing a text (e.g., an icon of paper) is displayed on the LCD 78. When the conditions for a text are not satisfied, a determination is then made as to whether or not conditions for flowers are satisfied. Conditions for flowers are as follows.

<Conditions for Flowers>
Brightness Value LV>6
The distance is macro.
Reliability RDF of distance information>0%

The photographic scene is determined, from white balance, to be flowers with high possibility.

In relation to white balance, when colors of substances, such as leaves and flowers, are intensive during determination of the light source of the subject and the color of the substance, the photographic scene is assumed to be flowers with high possibility. When the conditions for flowers are satisfied, a photographic scene is determined to be flowers (S408), and a symbol or icon representing flowers is displayed on the LCD 78. When the conditions for flowers are not satisfied, a determination is then made as to whether or not conditions for a close-up are satisfied (S409). Conditions for a close-up are as follows.

<Conditions for a Close-Up>
The distance is macro
Reliability FDR of distance information>0%

When conditions for a close-up are not satisfied, settings are made to the AUTO mode. Even when the reliability of distance information is determined to be low in S404, settings are made to the AUTO mode. In the prior art, the photographic scene is determined to be a close-up or flowers on the basis of the distance information acquired through the TTL-AF operation. However, in the present embodiment, the photographic scene is determined to be a close-up or flowers only when the distance information acquired through the TTL-AF operation is trustable. Hence, erroneous determination of the photographic scene can be effectively prevented.

When the distance is determined to be remote in S403, a determination is made as to whether or not conditions for snow/beach are satisfied. Conditions for snow/beach are as follows.

<Conditions for Snow/Beach>
Brightness Value LV>13
The distance range is standard.
Reliability FDR of distance information>0%

In relation to white balance, the photographic scene is snow or beach with high possibility. In the present embodiment, snow and beach are not distinguished from each other. However, for example, the photographic scene may further be determined to be snow or beach from the temperature, or the like, of a lower portion of a screen. When conditions for snow/beach are satisfied, the photographic scene is determined to be snow/beach (S412). A symbol or icon representing snow or a seashore is displayed on the LCD 78. When the conditions for snow/beach are not satisfied, a determination is made as to whether or not conditions for a landscape are satisfied (S413). Conditions for a landscape are as follows.

<Conditions for a Landscape>
Distance Information>9 m
Reliability FDR of distance information>0%

When the conditions for a landscape are satisfied, the photographic scene is determined to be a landscape (S414). A symbol or icon representing a landscape is displayed on the LCD 78 (S414). When the conditions for a landscape are not satisfied, a determination is made as to whether or not conditions for backlight are satisfied (S415). Conditions for backlight are as mentioned previously. When the conditions for backlight are satisfied, the photographic scene is determined to be backlight (S416). When the conditions are not satisfied, settings are made to the AUTO mode (S417).

Thus, in the present embodiment, the photographic scene is automatically, appropriately determined by use of the reliability of distance information.

Appropriate photographic parameters set for each automatically-determined photographic scene are arbitrary. However, for instance, the parameters can be set as follows for each of a photographic scene.

<When the Photographic Scene is Candlelight>
Flash: Forcefully inactive
White Balance: Daylight
<When the Photographic Scene is a Night Portrait>
Flash: Firing light with forceful lessening of red-eyes during AUTO operation
<When the Photographic Scene is a Portrait>
Flash: In accordance with user settings
<When the Photographic Scene is Backlight>
Flash: Forceful firing of light
<When the Photographic Scene is a Text>
Flash: In accordance with user settings
Exposure Correction: +1 EV
Sharpness: High Level
<When the Photographic Scene is Flowers>
Flash: In accordance with user settings
White Balance: Daylight
<When the Photographic Scene is a Close-Up>
Flash: In accordance with user settings
<When the Photographic Scene is Snow/Beach>
Flash: In accordance with user settings
Exposure Correction: +1 EV
<When the Photographic Scene is a Landscape>
Flash: Forcefully inactive
White Balance: Daylight
Sharpness: High Level In relation to the night portrait, the reason why light is fired with forceful reduction of red eyes even when the user settings are flash AUTO is because light is known to be automatically fired with reduction of red eyes because of a dark environment, presence of a person, and firing of a flash. Correctly determining the photographic scene as a night portrait enables appropriate firing of a flash.

PARTS LIST

10 detection section
12 setting information
14 white balance information
16 determination section
50 lens
52 CCD
54 A/D converter
56 AWB memory
58 image memory
62 parameter detection section
64 separation circuit
66 edge processing circuit
68 separation circuit
70 white balance circuit
72 color correction circuit
74 color correction circuit
76 separation circuit
78 LCD 80 timing generator
82 strobe
83 memory controller
84 strobe light control section
86 zoom control section
88 ISO control section
90 mode changeover switch
92 value computing section
94 face recognition circuit
96 mode-selection section
98 photographic setting section
100 external operation section
102 parameter setting section
104 image memory
106 compression/decompression circuit
108 recording medium

What is claimed is:

1. An imaging device comprising:
a photographic scene determination unit that automatically determines a photographic scene in accordance with a plurality of parameters including a distance to a subject;
a control unit that controls photographing conditions in accordance with the photographic scene determined by the determination unit;
an autofocus mechanism that acquires information about a first distance to the subject and automatically controls focus;
an evaluation unit that quantitatively evaluates an amount of reliability about the first distance to the subject; wherein
the photographic scene determination unit determines the photographic scene in accordance with the amount of reliability.

2. The imaging device according to claim 1 wherein the evaluation unit includes
a unit that detects a face portion included in a subject; and
a unit that detects information about a second distance to the subject by use of a physical geometry of the detected face portion, wherein
the amount of reliability of the first distance information acquired by the autofocus mechanism is evaluated by use of the second distance information.

* * * * *